US 6,717,280 B1

United States Patent
Bienville

(10) Patent No.: US 6,717,280 B1
(45) Date of Patent: Apr. 6, 2004

(54) BICYCLE BASED EMERGENCY BATTERY CHARGING SYSTEM

(76) Inventor: Francis Bienville, P.O. Box 7083, Torrance, CA (US) 90504-0983

( * ) Notice: Subject to any disclaimer, the term of this patent is extended or adjusted under 35 U.S.C. 154(b) by 0 days.

(21) Appl. No.: 09/514,911

(22) Filed: Feb. 28, 2000

(51) Int. Cl.$^7$ .......................... H02P 9/04; B62M 23/02; H02K 7/00
(52) U.S. Cl. ................... 290/1 R; 290/1 D; 310/67 A; 180/205
(58) Field of Search ................. 310/67 A; 290/1 R, 290/1 O; 180/205; 320/123

(56) References Cited

U.S. PATENT DOCUMENTS

| | | | | |
|---|---|---|---|---|
| 3,210,634 A | * | 10/1965 | Stern | 320/123 |
| 3,705,721 A | * | 12/1972 | Lulay et al. | 272/73 |
| 3,884,317 A | * | 5/1975 | Kinzel | 180/34 |
| 4,095,663 A | * | 6/1978 | Gaffney | 180/33 C |
| 4,606,193 A | * | 8/1986 | Molina | 60/698 |
| 4,709,917 A | * | 12/1987 | Yang | 272/73 |
| 5,316,101 A | * | 5/1994 | Gannon | 180/221 |
| 5,616,104 A | * | 4/1997 | Mulenburg et al. | 482/57 |
| 5,788,007 A | * | 8/1998 | Miekka | 180/205 |
| 5,799,747 A | * | 9/1998 | Olsen | 180/221 |
| 5,903,224 A | * | 5/1999 | Reynolds | 340/815.45 |
| 6,093,985 A | * | 7/2000 | Chen | 310/67 A |
| 6,118,196 A | * | 9/2000 | Cheng-Yon | 310/75 C |
| 6,152,249 A | * | 11/2000 | Li et al. | 180/205 |
| 6,229,224 B1 | * | 5/2001 | Gagne | 290/1 R |
| 6,260,649 B1 | * | 7/2001 | Carney, Jr. | 180/220 |

FOREIGN PATENT DOCUMENTS

GB       2020375 A       * 11/1979 ............. F17C/1/00

* cited by examiner

*Primary Examiner*—Nicholas Ponomarenko
*Assistant Examiner*—Julio Gonzalez
(74) *Attorney, Agent, or Firm*—Mark C. Jacobs

(57) ABSTRACT

A battery charging system that utilizes pedal power from a stationary cyclist, to rotate a hub which is connected by belt or chain to a dynamo. The dynamo has a hub which receives the chain or belt to permit rotation of the movable wheel thereof relative to a fixed wheel, both of which wheels house a series of magnets around their facing peripheries. Preferably a coaster clutch is found in the intermediate hub to permit the cyclist to rest periodically while the rotatable wheel of the dynamo continues to rotate thereby creating a DC current, suitable for the charging of a battery(is) electrically connected thereto. The front wheel is held off the ground by a pair of cradles to permit rotation during pedaling, while the intermediate derailleur is held in a stabilizer for better balance.

15 Claims, 5 Drawing Sheets

US 6,717,280 B1

BICYCLE BASED EMERGENCY BATTERY CHARGING SYSTEM

FIELD OF THE INVENTION

This application pertains to a battery charging system that utilizes a pedal powered flywheel for the generation of electricity to power a battery charger.

BACKGROUND OF THE INVENTION

In this the year of Y2K with the world facing a mystery as to whether the power grid will deliver power as needed, there has arisen great worry concerning the availability of power. Such worries have arisen in all of big city, small town, and in rural America. It is an object therefore of this invention to provide a bicycle powered battery charger.

It is another object to provide a flywheel operated battery charger that is pedal powered.

It is a further object to provide a battery charging system that it portable.

It is a still further object to provide an emergency battery charging system that is easy to setup and operate.

It is yet another object to provide an emergency battery charging system for batteries such as marine batteries that can provide the needs to power a small household or parts thereof during the times of natural disasters when normal power is interrupted.

Other objects of the invention will in part be obvious and will in part appear hereinafter.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A bicycle pedal powered flywheel generator that generates electricity for charging batteries to be used in emergency times of natural disaster for the provision of DC power to a household. A bicycle rear wheel derailleur, the intermediate derailleur is connected to both the front derailleur of a bicycle and to a rear derailleur or hub which in turn is connected to a rotatable flywheel having fixed spaced magnets thereon. When the rotatable flywheel rotates in close proximity to a fixed wheel also having similarly spaced magnets, a current is induced in accordance with principles established by Michael Farraday. This induced current is passed to a battery charger of a conventional nature to charge up marine 36 volt batteries. The connection from the rear deraileur to the flywheel is preferably external of the housing for the flywheel. Both the front wheel and the intermediate derailleur are supported off the ground to permit the front wheel to rotate yet stay stationary, and to balance the rear of the apparatus for stability.

DESCRIPTION OF THE PREFERRED EMBODIMENT

Figure 1:
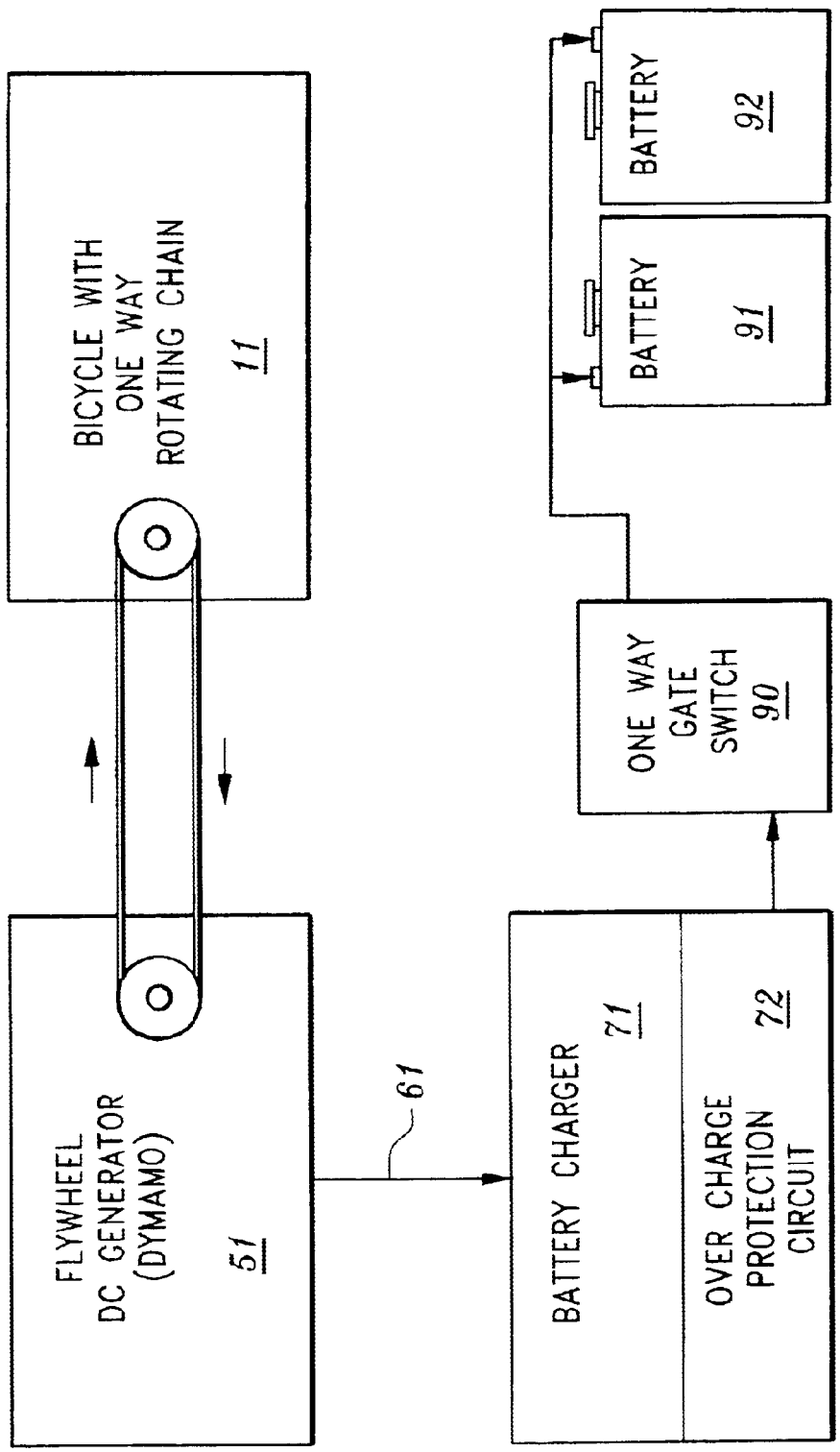
FIG. 1 is a diagrammatic view that illustrates the procedure of this invention.

The invention is best depicted in FIG. 1 wherein the various components of the apparatus are seen diagrammatically. Thus a bicycle 11 having a one-way chain is connected to a flywheel generator, often called a dynamo, 51 which when activated generates DC power 61. Power 61 is fed to the battery charger 71, having an overcharge protection circuit, 72, therein and also containing a one-way gate switch 90 such that current can only flow one way into the batteries 92 and 91 such that when fully charged the battery charger shuts off.

Figure 2:
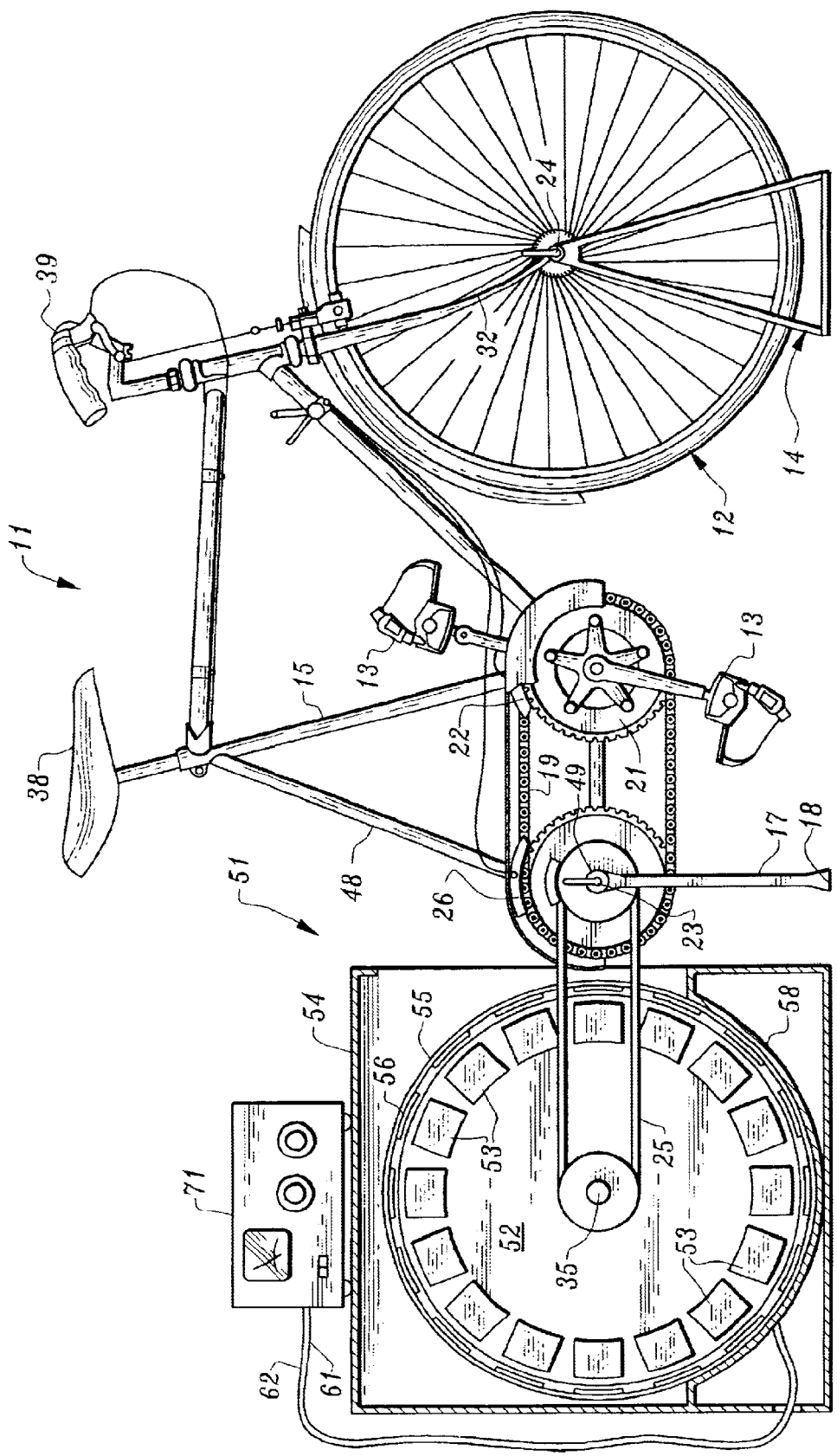
FIG. 2 is a perspective view of the components forming the apparatus of this invention.

Reference is now made to FIG. 2, for the details of this invention. Here is seen a bicycle 11 which includes a saddle or seat 12 for the rider to sit on. Bike 11 also includes a set of opposed pedals 13 each connected to a crank arm 15, interconnected in a conventional manner to a front derailleur 22. The derailleur 22 carries a chain 19 which engages an intermediate rear derailleur 26 having a centrally disposed first hub 23 concentrically mounted therein. A pair of vertical stabilizers 17, one on each side supports first hub 23. A horizontal connector member 18, joins the two vertical stabilizers 17.

Figure 6:
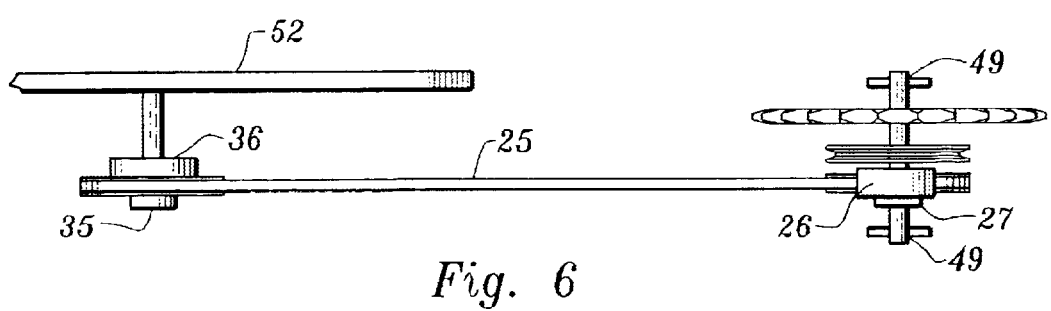
FIG. 6 is a top plan view of a portion of the instant invention.

The bike also includes a front axle 24, which carries the front wheel 12. Front wheel 12 may be raised off the ground by the placement of cradles 14 under axle 24, to permit the front wheel to rotate yet stay in a stationary location. Cradles 14 may be attached as by bolting to platform 43. Other common bicycle components such as front fork 37, seat 38 and handlebar set 39 are all present as being conventional parts of a bicycle, among others such as rear frame members 48, with their hub cleat mountings 49 which may be shown, but play no role in the invention of this application other than being used for their normal intended purpose. For this reason they need not be discussed. See FIG. 2 and FIG. 6.

Figure 9:
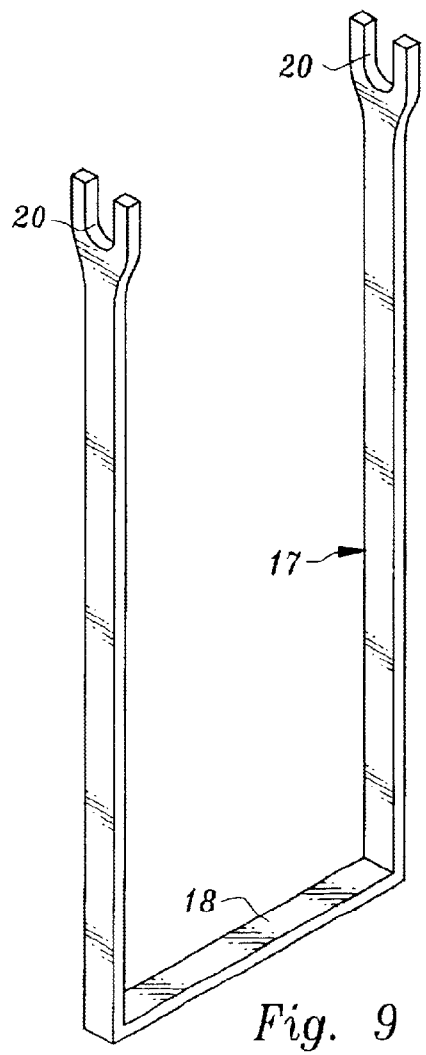
FIG. 9 is a perspective view of the support seen in FIG. 1 and which forms part of this invention.

Reference is also made to FIG. 9 wherein the roller bearing yoke 20 at the top of each stabilizer 17 is seen. Hub 23 extends on each side to sit in the roller bearing containing yoke, such that the rear of the apparatus is given stability, yet the hub 23 of the intermediate derailleur can freely rotate.

Figure 3:
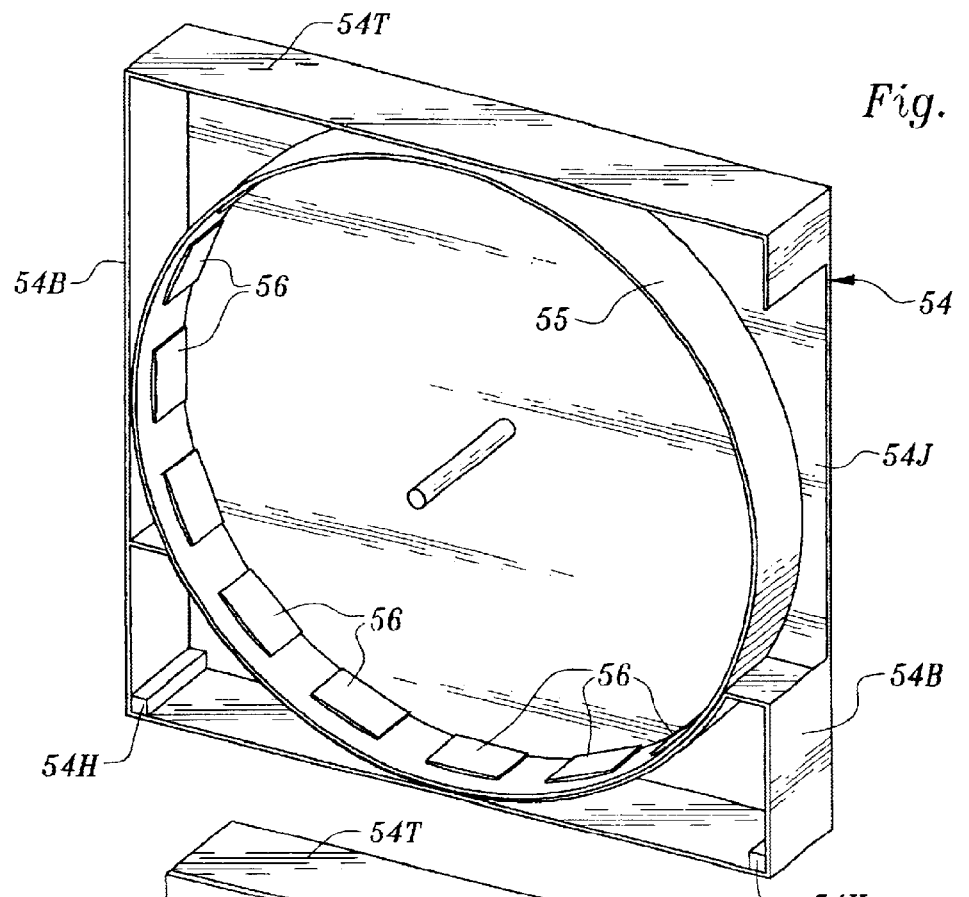
FIG. 3 is an elevational view of the interior of the housing of the flywheel wherein the fixed magnets are located.

A belt 25 is disposed between first hub 23 and a rearwardly disposed second hub 35. Circumscribing and mounted on this second hub 35 is a fly wheel 51. Fly wheel 51 is a solid plastic wheel of approximately 2 to 3 feet in diameter, having a series of spaced fixed magnets 53 therein disposed in a circle around the periphery. As is known this rotates relative to a fixed wheel 55 having similarly spaced magnets 56, and seen in FIG. 3.

Figure 4:
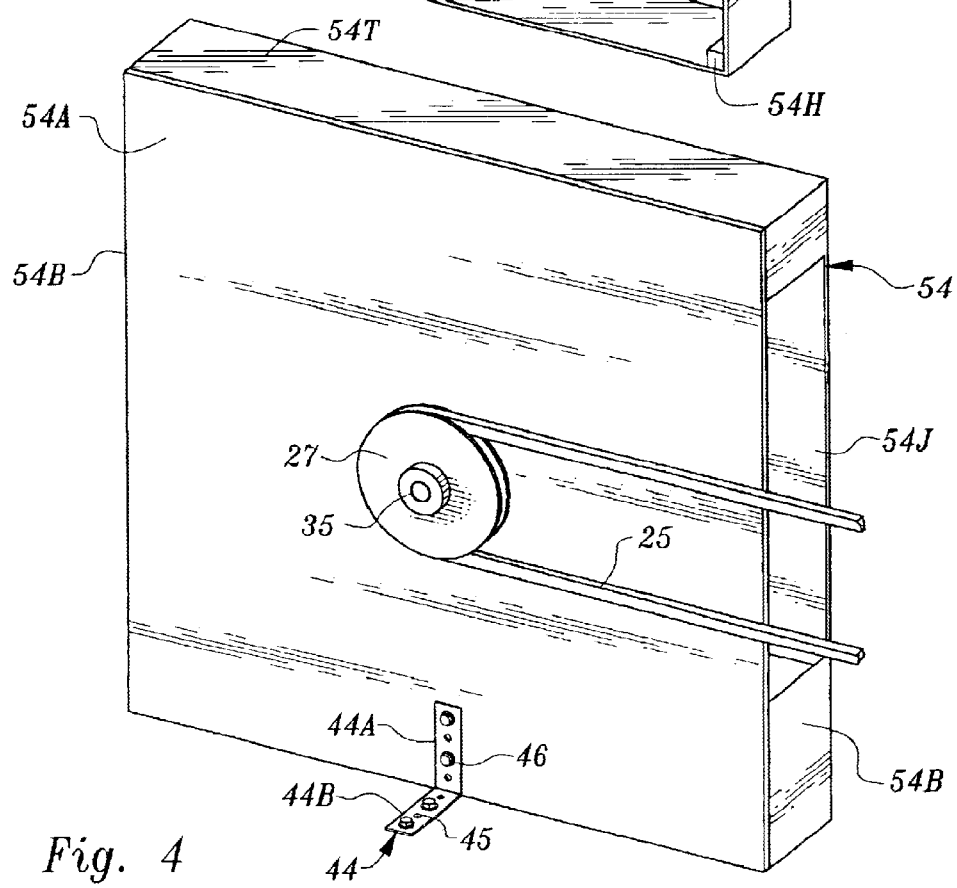
FIG. 4 is an external perspective view of the housing of the flywheel showing a first embodiment of the connection to the intermediate derailleur.
Figure 5:
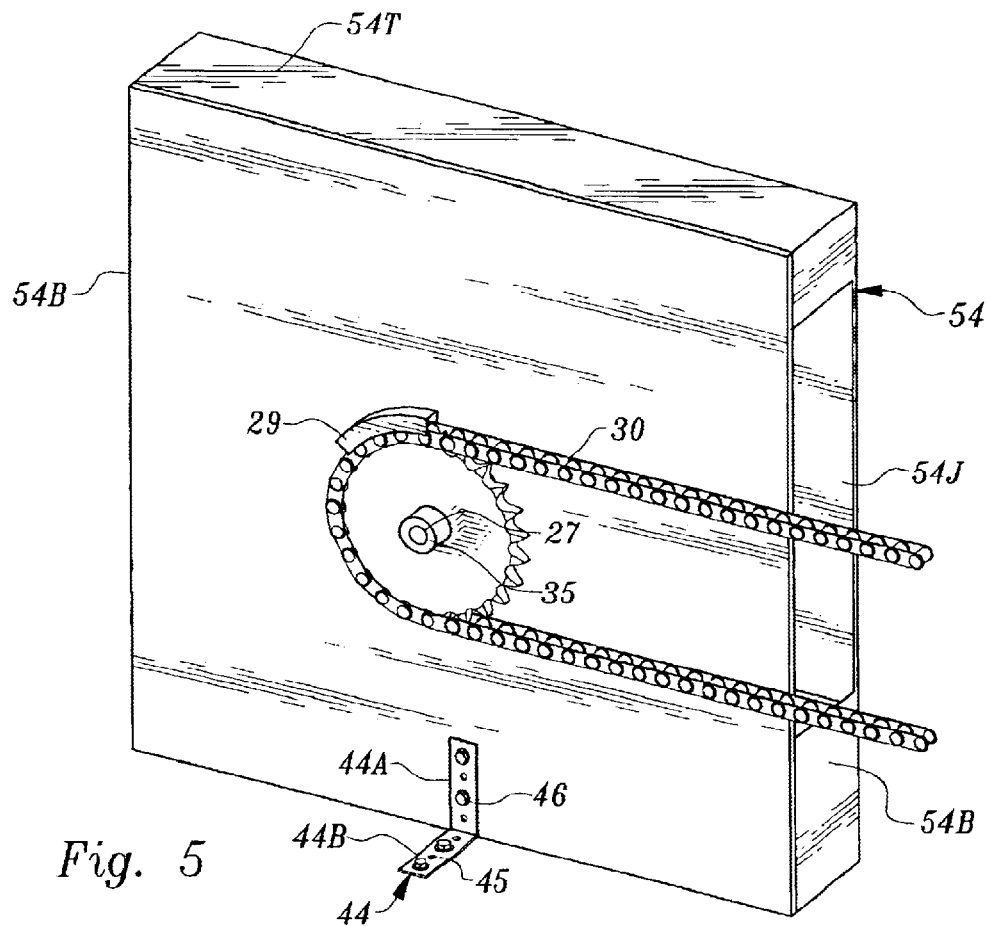
FIG. 5 is an external perspective view of the housing of the flywheel showing a second embodiment of the connection to the intermediate derailleur.

Housing 54, seen in its entirety in FIGS. 4 and 5, is a structure sized slightly larger than the fixed wheel of the flywheel also known as a dynamo 51. Housing 54 includes a pair of spaced sidewalls 54A and B, a top wall 54T, and a rear wall 54D. A horizontal connector bar 54H located at ground level connects the two sidewalls 54A, 54B. The front opening 54J permits access to the moving wheel and the fixed one as well as may be needed.

Figure 10:
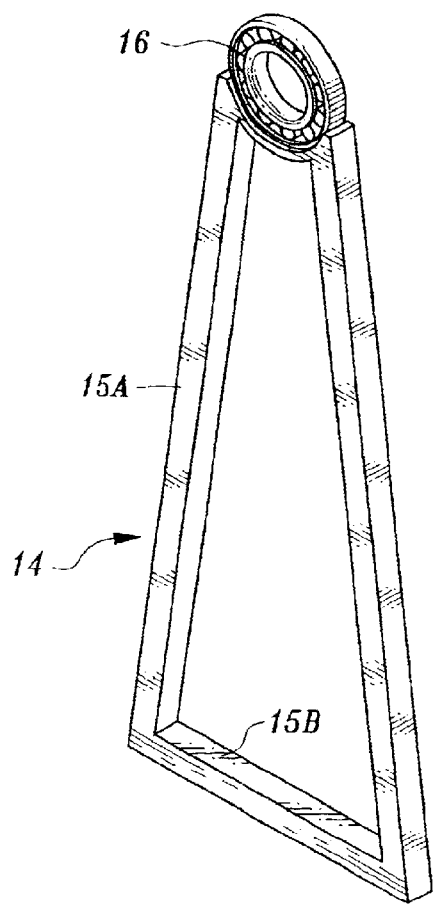
FIG. 10 is perspective view of one of the cradles used to raise the front wheel off the ground to permit rotation thereof.

In order to stabilize the front wheel to prevent side to side movement and to permit it to rotate freely during pedaling action,(though rotation is not related to pedaling speed ) it is suggested that the front wheel be raised off the ground or off the platform as will be discussed infra. The cradles 14, seen in both FIG. 2 and in FIG. 10 serve this function. Each cradle 14 has a pair of upwardly converging legs. The legs are connected at their widest end (the bottom) by a horizontal connector 15B. A roller bearing containing yoke 16 receives an extended axle 24 on each side of the wheel seat 38,—FIG. 2—to raise the front wheel off the ground and stabilize it against side to side movement. Each cradle may be mounted directly to the platform, 43 as by bolting, or to one of alignment members 47 if such are employed, as by also being bolted thereto. Whether the front wheel is raised or not, has no bearing on the operation of this apparatus.

The housing shown in FIGS. 4 and 5 is the same housing and is also labeled 54. Attached to at least one side of the housing 54 is an L-shaped bracket, 44 which has an upstanding portion 44A and a horizontal portion 44B. Bolts or screw 46 connect the bracket 44 to the housing side wall 54A, through suitable apertures 45, not seen. The apertures 45 that are seen in FIG. 4 are for connection to the platform discussed in detail in FIG. 8. Such a bracket 44 is also included with the embodiment of the housing shown in FIG. 5, but need not be discussed. Further details about the housing only need not be provided as they are the same. The differences in the two figures are the elements attached thereto on the outside of the structure, such as hub 35 which will be discussed infra, in the section dealing with Power Creation.

The housing 54, as seen in FIG. 4, but shown in cutaway in FIG. 2, holds the dynamo 51 which includes a rotating wheel to be discussed infra, and a fixed plastic or nonferrous wheel 55 having a series of spaced magnets 56 disposed around the interior facing wall of wheel 55. A cradle 14 disposed within housing 54 rigidly holds wheel 54 in place. Cradle 58 can be of any suitable configuration and is considered to be conventional. See FIG. 3.

The magnets may be surface mounted or disposed within the case of the fixed wheel as is known in the art. A pair of electrical leads 57 are mounted in conventional fashion to carry the induced current from the dynamo 51.

The dynamo or generator 51 depicted in this invention is a direct current or DC generator since the conductors rotate in a stationary magnetic field.

In FIG. 2 which shows the housing 54 in a cutaway view, the reader can see the rotating wheel 52 mounted on hub 35. Wheel 52 is of the same diameter as fixed wheel 55 and contains a similar spaced array of magnets 53. When wheel 52 rotates, the magnets disposed therein pass in close proximity to the magnets in the fixed wheel to induce an electric current.

The design and operation of such dynamos is well understood by those familiar with electrical circuits and indeed dynamos per se form part of the prior art. It is the operation and use of the dynamo that forms the crux of this invention.

Flywheels of this type of construction are conventionally known. Thus further details of flywheels need not be set forth. DC power 61 generated by the pedaling of a cyclist who operates the flywheel 51, is carried by wiring 62 from the flywheel 51 to the battery charger 71, for charging batteries 92, as shown in FIG. 1.

Figure 8:
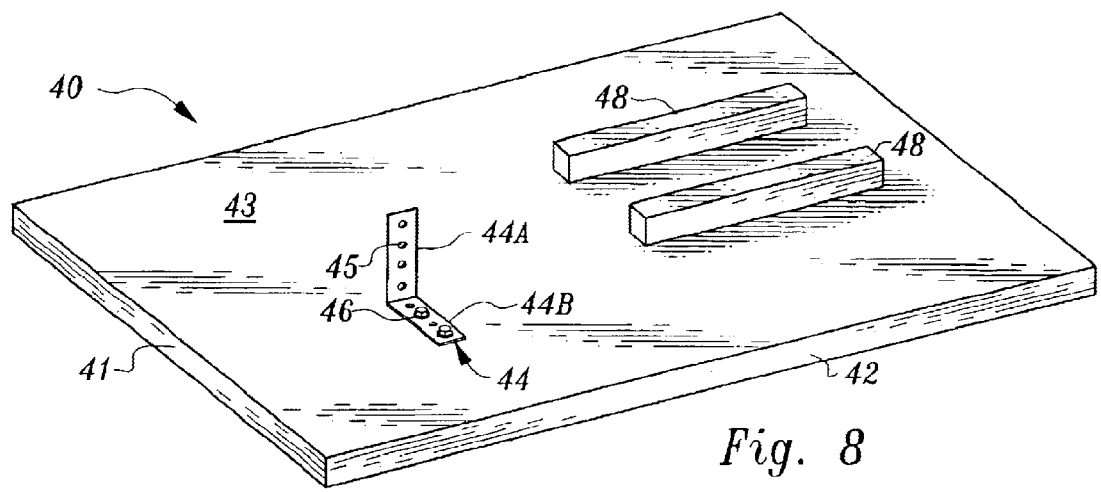
FIG. 8 is a perspective view of a support for the apparatus of this invention.

The reader is now directed to FIG. 8. Here, an overall support 40, for the apparatus of this invention is shown. This support is intended to provide stability to the apparatus during periods of use. The support 40 includes front and rear spaced walls 41, which may be 2×4 or 2×6 boards; and spaced side walls 42, which also would be similarly sized. A platform 43, such as a plywood sheet, is screwed, nailed or otherwise attached to the walls spaced up from the ground.

At least one L-shaped bracket 44, similar to the ones depicted in FIGS. 4 and 5 is seen at the proximal end of the platform. Here the bracket 44 is shown bolted or screwed to the platform 43 by elements 46. Apertures 45 are for similar connectors to be used to attach the bracket to the housing 54 for stability. At the distal end of the platform are a pair of optional upstanding spaced alignment members 48 which may be 2×4 or 2×6 inch boards. The positioning of these if employed is in abutment to each side of the front wheel, to keep the front wheel from turning side to side. Prevention of front wheel sway may also be achieved via the use of the cradles 14 discussed supra wherein a different purpose is recited, which cradles are as noted, mounted on the top of the alignment members, if the members are employed or by placing the cradles on a flat surface, or preferably mounting the cradles to a support such as platform 43.

Suitable batteries to be charged in this fashion are lead acid 12 volt cells, such as are used in automobiles.

Marine batteries which are 6 or 12 volt lead acid batteries shaped similar to an automobile battery, are able to deliver more power than a car battery, such as for a motor home, houseboat or when used in a plurality to operate all or part of the appliances of a small home. Marine batteries are available from various vendors in the marketplace.

An overcharge protection circuit 72, known to the art, can optionally be included to prevent overcharging of the batteries. Such a circuit is highly recommended.

In order to prevent electrical back flow these relatively strong heavy-duty batteries, a one way gate switch to permit current to only flow to the batteries should be incorporated in the circuitry.

POWER CREATION

The discussion now turns to Power Creation. When the rider, not seen, rotates the pedals 13 of bicycle 11, chain 19 rotates around the intermediate derailleur 26, located at the rear of front derailleur 22. See FIG. 2. A hub 23 is disposed for rotation through the center of intermediate derailleur 26 and extends laterally outward therefrom. See FIG. 6. A second hub 35 is disposed through wall 54A and retained in a bearing 27 in said housing wall. A belt 25 configured as an endless loop is mounted with tension such that rotation of the intermediate hub will translate motion to the rear hub such that it will rotate.

Figure 7:
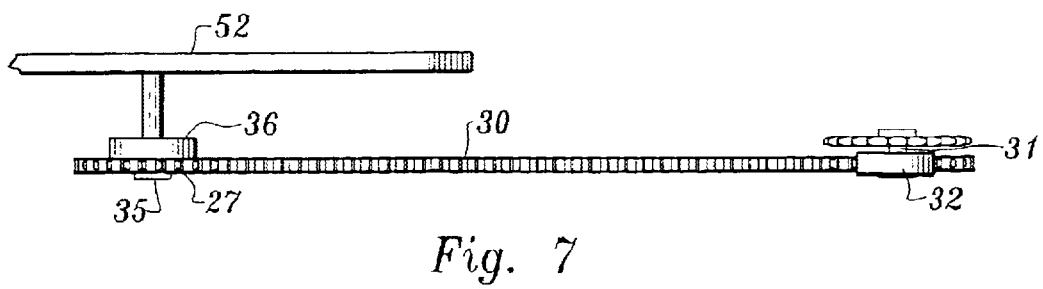
FIG. 7 is a view similar to FIG. 6 but of an alternate embodiment of the same portion of the invention.

In FIG. 5 an alternate connection between the intermediate hub and the rear hub of the dynamo 51 is seen. Here a toothed rear derailleur 29 mounted on the hub 35, which hub is retained in a bearing, again 27 is employed. A second chain 30 forms an endless loop between intermediate 23 and the rear derailleur 27. Reference is also made to FIG. 7. For such an embodiment hub 23 would be replaced by a toothed hub 31 as shown in FIG. 7. Teeth 32 would then engage chain 30 in a conventional manner.

By use of the battery charging apparatus of this invention, it is believed that a heavy duty battery could be charged by a cyclist in about 30 minutes. Since the rotating wheel is directly linked to the intermediate hub, if the cyclist were to stop pedaling, the rotating wheel of the dynamo would stop rotating.

Therefore to permit the cyclist to rest from time to time, it is recommended that a conventional coaster clutch 36 as found in bicycles be incorporated into the intermediate hub such that it will continue to rotate, thus cover the movable wheel to rotate even though the chain 19 is not moving while the cyclist is at rest. Such coaster clutches are made by Shimano among others and are available in the marketplace prebuilt into hubs.

It is seen that I have disclosed an emergency battery charging system that can employ mostly during times of natural disaster; i.e., hurricanes, after typhoons and other storms, but on a continual basis in underdeveloped countries where electricity from a central source is not delivered to each household.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A process for recharging batteries which comprises:
   (a) coupling a dynamo to the intermediate hub of a stationary bicycle, which bicycle also has a front axle to which is mounted a front wheel, a front derailleur, and an interconnected crank and set of pedals attached in conventional fashion, said front derailleur being operatively connected to said intermediate hub;
   said dynamo comprising a housing having a fixed wheel containing a series of spaced periphery mounted magnets, and a rotatable wheel also having a similar series of periphery mounted magnets in close proximity, wherein said coupling of said dynamo is between the rotatable wheel and said intermediate hub,
   whereby pedaling of the stationary bicycle causes the intermediate hub to rotate, and simultaneously said dynamo's rotatable wheel to rotate due its connection to the front derailleur, and to produce a current,
   (b) conducting said current generated between the fixed and rotatable rear wheel, to a battery charger having one or more batteries therein,
   (c) charging the one or more batteries with said charger.

2. The process of claim 1 further including preventing a back flow of current from the batteries to the dynamo.

3. The process of claim 1 also including the step of preventing the overcharge of said batteries.

4. A bicycle pedal powered battery charging system for use during times when electrical power is not being delivered which system comprises:
   (a) a stationary bicycle comprising a seat for a rider, a front derailleur interconnected to a crank and pedal set, said stationary bicycle also having a rear derailleur mounted on an intermediate hub and having a front wheel;
   (b) a dynamo comprising a housing having a fixed wheel, said fixed wheel having a series of peripherally mounted spaced magnets; and said dynamo also having a rotatable wheel having a similar set of periphery mounted spaced magnets, the two wheels being in close proximity and the respective magnets facing each other, said rotatable wheel being mounted on a rear hub,
   (c) means for operatively interconnecting said rear hub to said intermediate hub,
   (d) a battery charge electrically connected to said dynamo for charging an external battery wherein a coupling of said dynamo is between the rotatable wheel and said intermediate hub, whereby pedaling of the stationary bicycle causes the intermediate hub to rotate, and simultaneously said dynamo's rotatable wheel to rotate due its connection to the front derailleur, and to produce a current.

5. The battery charging system of claim 4 wherein the means for operatively interconnecting said rear hub to said intermediate hub is a chain.

6. The battery charging system of claim 4 wherein the means for operatively interconnecting said rear hub to said intermediate hub is a continuous belt.

7. The battery charging system of claim 4 further including a coaster clutch incorporated into the intermediate hub.

8. The battery charging system of claim 7, further including an overcharge protection circuit.

9. The battery charging system of claim 7 further including a one-way gate switch to prevent power from returning from the batteries to the generator.

10. A bicycle pedal powered battery charging system for use during times when electrical power is not being delivered which system comprises:
    (a) a stationary bicycle comprising a seat for a rider, a front derailleur interconnected to a crank, and pedal set, said stationary bicycle also having a rear derailleur mounted on an intermediate hub and having a front wheel,
    (b) a dynamo comprising a housing having a fixed wheel, said fixed wheel having a series of peripherally mounted spaced magnets; and said dynamo also having a rotatable wheel having a similar set of periphery mounted spaced magnets, the two wheels being in close proximity and the respective magnets facing each other, said rotatable wheel being mounted on a rear hub,
    (c) means for operatively interconnecting said rear hub to said intermediate hub,
    (d) a battery charger electrically connected to said dynamo for charging batteries not connected to said dynamo, wherein the means for operatively interconnecting said rear hub to said intermediate hub is selected from the group consisting of a chain and a belt, and
    (e) a coaster clutch incorporated into the intermediate hub wherein a coupling of said dynamo is between the rotatable wheel and said intermediate hub, whereby pedaling of the stationary bicycle causes the intermediate hub to rotate, and simultaneously said dynamo's rotatable wheel to rotate due its connection to the front derailleur, and to produce a current.

11. The battery charging system of claim 10, further including both an overcharge protection circuit and a one-way gate switch to prevent power from returning from the batteries to the generator.

12. The charging system of claim 10 wherein the rear hub is disposed in a bearing mounted in the housing.

13. The charging system of claim 4 including means for supporting said front wheel off the ground in a fixed position.

14. The charging system of claim 4 further comprising a support having a pair of spaced alignment members one on each side of the front wheel.

15. The charging system of claim 14, including an L-shaped plate to retain the dynamo housing in a fixed position.

* * * * *